United States Patent
Takeuchi et al.

(10) Patent No.: US 7,349,986 B2
(45) Date of Patent: Mar. 25, 2008

(54) METHOD FOR DATA DISTRIBUTION

(75) Inventors: Tadashi Takeuchi, Yokohama (JP);
Damien Le Moal, Sagamihara (JP);
Shinya Kato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/645,069

(22) Filed: Dec. 26, 2006

(65) Prior Publication Data
US 2007/0106812 A1 May 10, 2007

Related U.S. Application Data

(63) Continuation of application No. 10/122,412, filed on Apr. 16, 2002, now Pat. No. 7,269,662.

(30) Foreign Application Priority Data
Apr. 16, 2001 (JP) .............................. 2001-116287

(51) Int. Cl.
G06F 15/16 (2006.01)
G06F 3/00 (2006.01)

(52) U.S. Cl. ................. 709/243; 725/93; 725/87; 725/98; 370/230; 370/235

(58) Field of Classification Search .................. 709/232
See application file for complete search history.

(56) References Cited

U.S. PATENT DOCUMENTS

| | | | |
|---|---|---|---|
| 6,032,189 A | 2/2000 | Jinzenji et al. | |
| 6,145,084 A | 11/2000 | Zuili et al. | |
| 6,697,836 B1 | 2/2004 | Kawano et al. | |
| 6,728,771 B2 | 4/2004 | Stumer | |
| 6,785,704 B1 | 8/2004 | McCanne | |
| 7,269,662 B2 * | 9/2007 | Takeuchi et al. ............ 709/232 | |

FOREIGN PATENT DOCUMENTS

| | | |
|---|---|---|
| JP | 10-247944 A | 9/1998 |
| JP | 11-68873 A | 3/1999 |
| JP | 11-184780 | 7/1999 |
| JP | 2000-228669 A | 8/2000 |

OTHER PUBLICATIONS

U.S. Patent Application, filed Apr. 5, 2002 (Our Ref. No. 62807-065).
Japanese Office Action issued in corresponding Japanese Patent Application No. 2001-116287, dated Aug. 29, 2006.

* cited by examiner

*Primary Examiner*—David Wiley
*Assistant Examiner*—Jude J Jean-Gilles
(74) *Attorney, Agent, or Firm*—McDermott Will & Emery LLP

(57) ABSTRACT

Stream data is transmitted from a distribution server to a client without any loss of data. The capacity of a reception buffer to be prepared at the client can be made small and the network bandwidth necessary for data redistribution can be narrowed. A relay server interposed between the distribution server and client buffers stream data in an auxiliary storage device. When the relay server or client detects a loss of stream data, a redistribution request is transmitted to the distribution server or another relay server at the preceding stage.

15 Claims, 13 Drawing Sheets

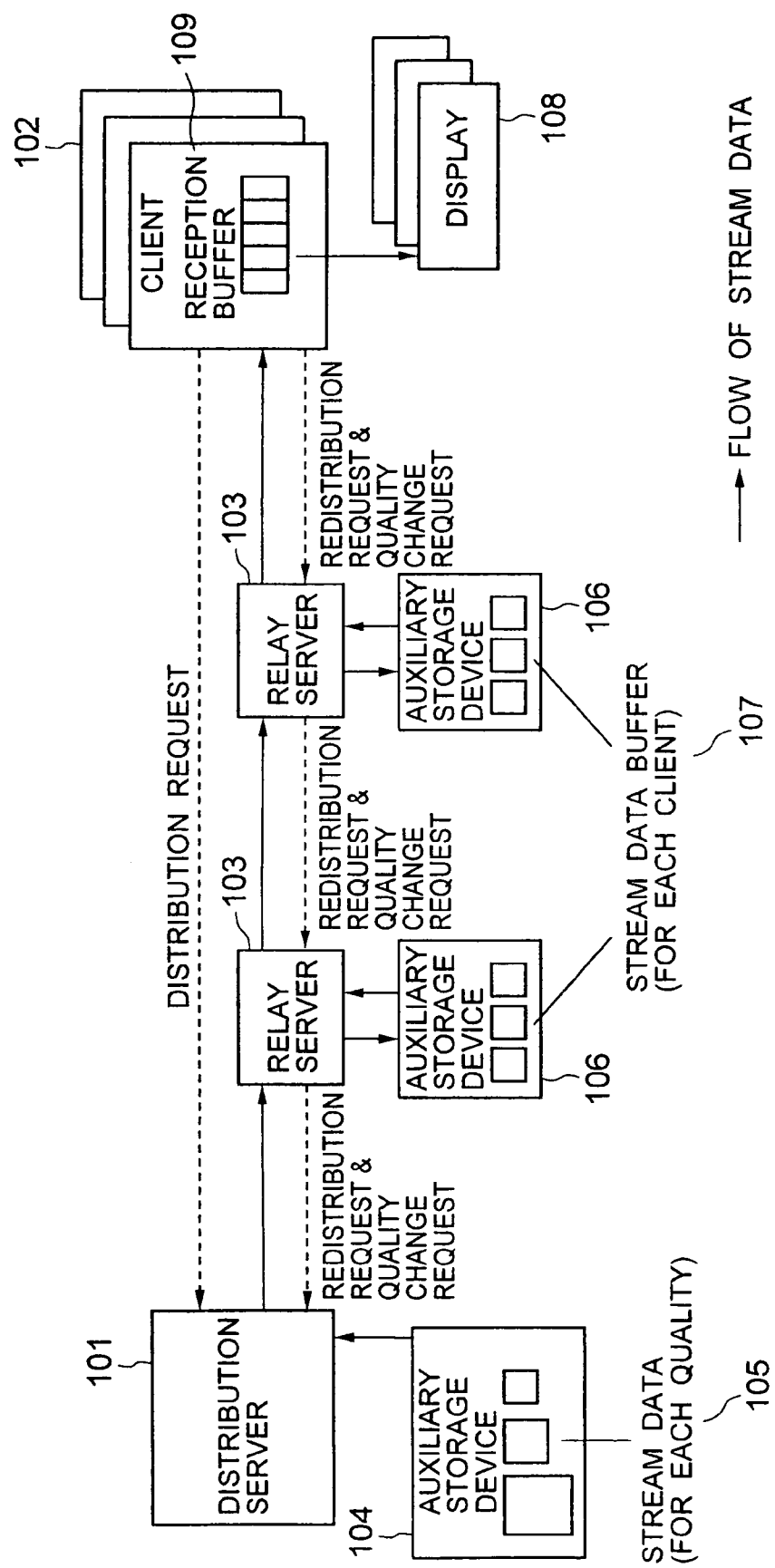

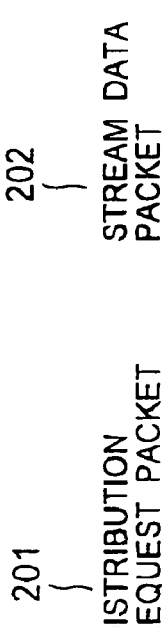
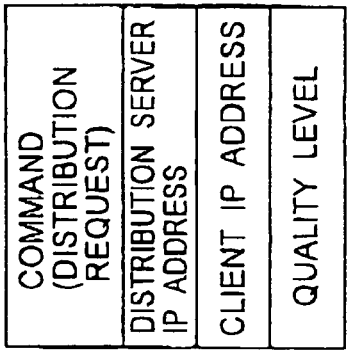
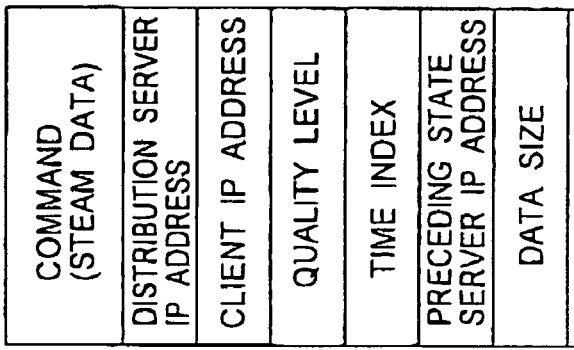
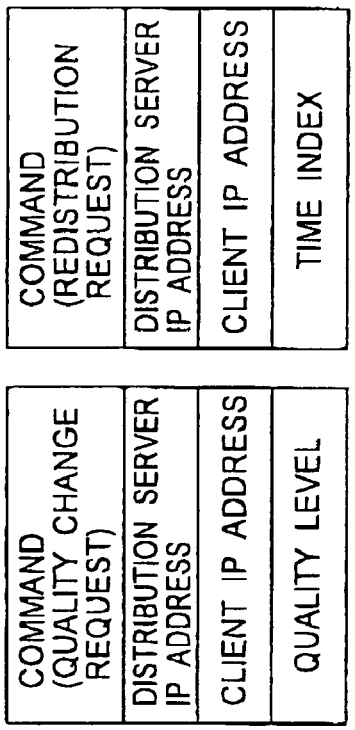
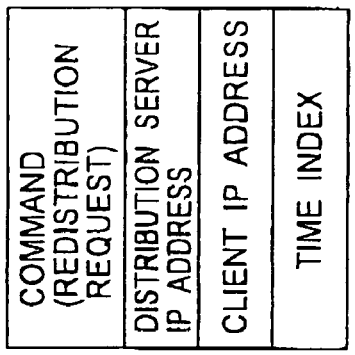
FIG. 2A  FIG. 2B  FIG. 2C  FIG. 2D

FIG. 4

| CLIENT IP ADDRESS (401) | CURRENT QUALITY LEVEL (402) | TRANSMITTED DATA TIME INDEX (403) |
|---|---|---|
| | | |
| | | |
| | | |
| | | |
| | | |
| | | |
| | | |
| | | |

| DISTRIBUTION SERVER IP ADDRESS | CLIENT IP ADDRESS | REQUESTED QUALITY | LOSS TIME INDEX LIST |
|---|---|---|---|
| 1304 | 1305 | 1306 | 1307 |

CLIENT MANAGEMENT TABLE PART

| DISTRIBUTION SERVER IP ADDRESS | RECEIVED DATA TIME INDEX | TRANSMITTED DATA TIME INDEX |
|---|---|---|
| 1301 | 1302 | 1303 |

DISTRIBUTION SERVER MANAGEMENT TABLE PART

METHOD FOR DATA DISTRIBUTION

RELATED APPLICATION

This application is a continuation of application Ser. No. 10/122,412, filed Apr. 16, 2002, now U.S. Pat. No. 7,269,662 which claims priority to JP 2001-116287 filed on Apr. 16, 2001; which are all incorporated herein by reference. This application also relates to U.S. patent application Ser. No. 10/116,210 entitled DATA RELAY METHOD filed by T. Takeuchi et al. on Apr. 5, 2002.

BACKGROUND OF THE INVENTION

The present invention relates to a data distribution method, and more particularly to a stream data distribution method of redistributing data to compensate for lost stream data and changing the quality of stream data in accordance with a network load.

A stream data distribution method of compensating for lost stream data and changing the quality of stream data is known as disclosed in JP-A-11-184780. This stream data distribution method disclosed in JP-A-11-184780 is used in a system having a distribution server and clients interconnected by a network.

The distribution server distributes stream data to a client over the network. The client loads a received stream data in a reception buffer. Stream data in the reception buffer is periodically read and displayed on a display.

The client refers to the state of the reception buffer in order to inspect whether there is stream data lost during network transfer. If there is a loss of stream data, the client transmits a redistribution request for lost stream data to the distribution server. Upon reception of the request, the distribution server executes a redistribution process for the requested stream data.

When the client refers to the state of the reception buffer, the client inspects whether the amount of stream data in the reception buffer becomes a predetermined amount or less and whether an occurrence probability of loss of stream data becomes a predetermined value or higher. If the data amount becomes the predetermined amount or less and the occurrence probability becomes the predetermined value or higher, the client transmits a quality change request to the distribution server. Upon reception of this request, the distribution server thins stream data to be transmitted thereafter in order to change the transmission rate (to lower a frame rate, i.e., time resolution).

With the method disclosed in JP-A-11-184780, the client is required to have a reception buffer of large capacity, resulting in an expensive client. Namely, according to the method disclosed in JP-A-11-184780, the client issues the redistribution request and quality change request to the redistribution server. If a network delay is large between the redistribution server and client, it takes a long time for redistributed data to arrive the client or for the rate change to be reflected, after the client transmits the redistribution request and quality change request. Therefore, unless the client prepares a reception buffer having a sufficient capacity, the reproduction process of reading the reception buffer starts or the underflow of the reception buffer occurs before arrival of redistributed data and reflection of a rate change.

With the method disclosed in JP-A-11-184780, a network bandwidth necessary for redistribution of stream data is broad. For example, in a system in which a distribution server and clients are connected via a plurality of routers, according to the method disclosed in JP-A-11-184780, even if stream data is lost in the network between intermediate routers, stream data is redistributed by using the bandwidth of the network from the distribution server to the client. The network bandwidth is consumed more than ideal redistribution of using the bandwidth of only the network between intermediate routers.

With the method disclosed in JP-A-11-184780, only the time resolution is lowered to change the quality of stream data. Even in the case that the image quality can be suppressed from being lowered if the space resolution is lowered, a degraded image quality on a display can be visually confirmed if the time resolution is lowered.

SUMMARY OF THE INVENTION

An object of the invention is to provide a stream data distribution method capable of reducing the capacity of a reception buffer to be prepared at a client, narrowing the bandwidth of a network necessary for redistribution, and changing the quality not only by lowering a time resolution but also by lowering a space resolution.

In order to achieve the above-described object, the invention provides a data distribution method which comprises the following steps. This data distribution method assumes that a distribution server reads stream data from its auxiliary storage device and transmits it to a client.

1) A plurality of stream data sets having different qualities are stored in an auxiliary storage device readable from a distribution server, and the distribution server reads only the stream data having a certain quality and transmits it.

2) Relay servers are provided between the distribution sever and a client, and stream data to be relayed by a relay server is once buffered in an auxiliary storage device readable from the relay server.

3) When the relay server detects a loss of stream data, the relay server issues a redistribution of lost stream data to the distribution server or another relay server at the preceding stage.

4) Upon reception of the redistribution request, the distribution server or relay server reads the stream data from the auxiliary storage device and redistributes it.

5) When the amount of stream data buffered in the auxiliary storage device by the relay server becomes a predetermined amount or less, or when the occurrence probability of loss of stream data becomes a predetermined value or higher, a quality change request of stream data is transmitted to the distribution server.

6) Upon reception of the quality change request, the distribution server change the stream data to be read from the auxiliary storage device to thereby change the quality of stream data to be transmitted.

BRIEF DESCRIPTION OF THE DRAWINGS

FIG. 1 is a block diagram showing the structure of a system according to a first embodiment of the invention.

FIGS. 2A to 2D show the formats of packets to be transferred between nodes.

FIG. 4 shows the structure of a distribution management table.

FIGS. 13A and 13B show the structure of a relay server management table.

DESCRIPTION OF THE EMBODIMENTS

Figure 3:
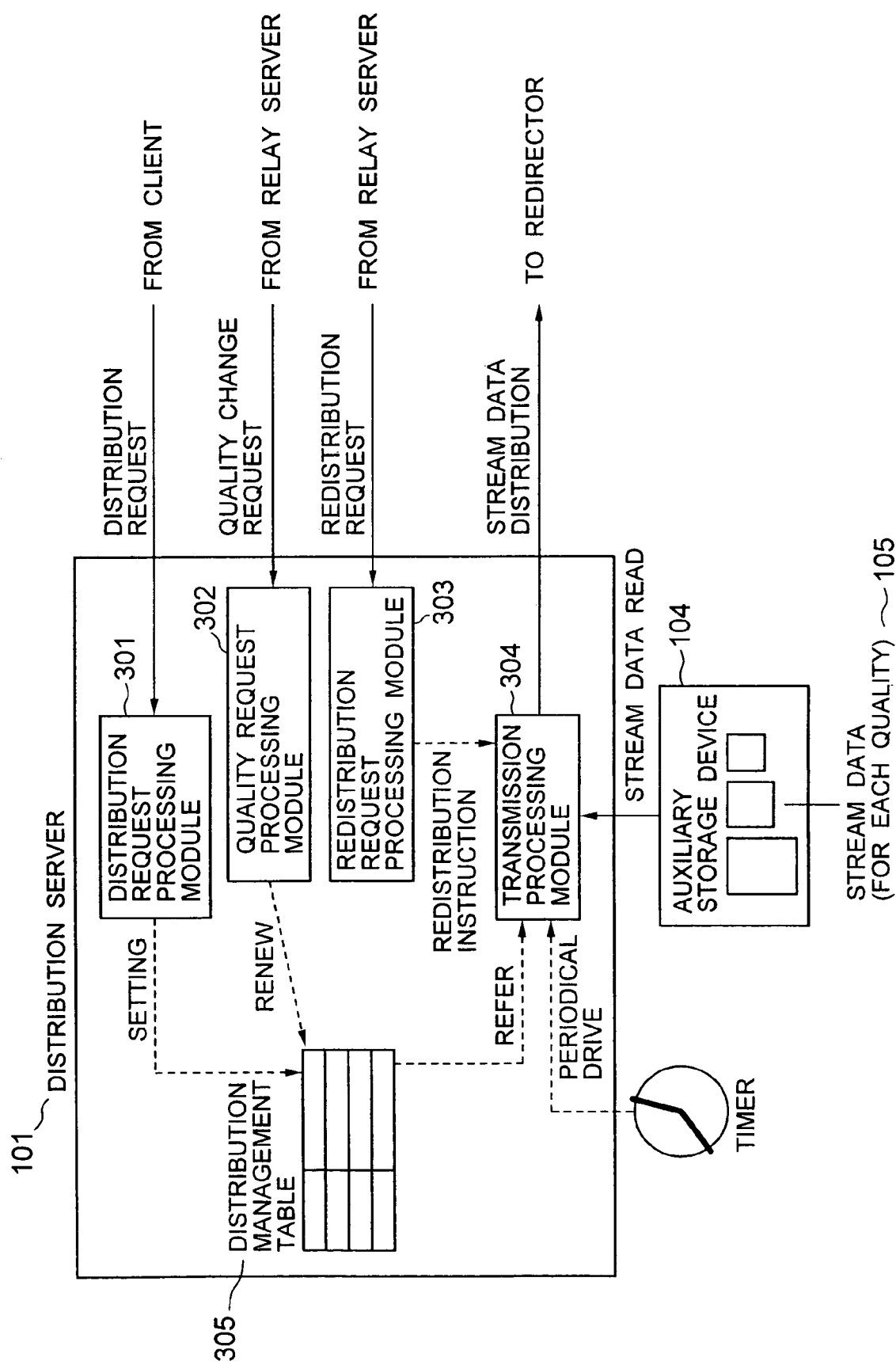
FIG. 3 is a block diagram showing the overall structure of a distribution server of the embodiment.

A first embodiment of the invention will be described.

FIG. 1 shows the structure of a system according to the first embodiment.

In this system, a distribution server 101 reads stream data from an auxiliary storage device 104 and transmits it. A client 102 buffers the received stream data in a reception buffer 109 and displays it on a display 108.

Stream data is transmitted in response to a distribution request from the client 102. The distribution request contains information of the quality of stream data to be distributed. The distribution server 101 stores beforehand stream data having different qualities in the auxiliary storage device 104, and reads only the stream data having the requested quality from the auxiliary storage device and transmits it to the client 102.

The transmitted stream data is relayed by relay servers 103 to relay it to the client 102. The relay server 103 has stream data buffers 107 for buffering to some degree the received stream data in an auxiliary storage device 106 at its node. The stream data buffers 107 are managed in the unit of each client. When the amount of data in the stream data buffer 107 becomes a predetermined amount or more, the stream data is sequentially read and transmitted to the client 102. The relay server 103 and client 102 refer to the stream data buffer 106 and reception buffer 109 and inspect whether there is a loss of stream data. If there is a loss, a data redistribution request is issued to the distribution server 101 or relay server 103 at the preceding stage. The distribution server 101 or relay server 103 reads the data from the auxiliary storage device 105 or 106.

The relay server 103 and client 102 refer to the stream data buffer 106 and reception buffer 109 and inspect whether the amount of buffered data in the buffer 106 becomes less than a predetermined amount and whether time index loss in the stream data becomes a predetermined value or higher. If the data amount is small or the occurrence probability is high, it is judged that the network is in an overload state, and a quality change request (a request of lowering the quality) is issued to the distribution server 101 or relay server 103 at the preceding stage. This request is sequentially relayed by each relay server 103 so that the request finally reaches the distribution server 101. Thereafter, the distribution server 101 reads only the stream data having the newly requested quality from the auxiliary storage device 105 and transmits it to the client 102.

The system having the structure shown in FIG. 1 has the following advantages:

1) The redistribution request process is executed between the subject node and adjacent distribution server or relay server. It is therefore possible to shorten the time from issuance of the redistribution request to arrival of redistributed stream data. Although the time from the quality change request to the actual quality change is the same as that of a conventional method, the capacity of a reception buffer to be prepared at the client can be made small because not only the client but also the relay server buffers the stream data.

2) Since the redistribution request process is executed between the subject node and adjacent distribution server or relay server, it is possible to narrow the network bandwidth to be consumed by redistribution.

3) Since the quality of stream data is changed by changing the stream data to be read from the auxiliary storage device by the distribution server, the quality change can be performed not only by lowering the time resolution but also by lowering the space resolution.

The format of data to be transferred between nodes shown in FIG. 1 will be described first, and then the structures of the distribution server, relay server and client will be described in detail.

FIGS. 2A to 2D show the formats of data to be transferred between nodes shown in FIG. 1. A format 201 of a packet storing a distribution request to be transmitted from a client to the distribution server has the following fields:

1) A "command" field for storing data indicating that the packet is a distribution request packet.

2) A "distribution server IP address" field for storing an IP address of the distribution server which is the transmission destination of the distribution request packet.

3) A "client IP address" field for storing an IP address of the client which is the transmission source of the distribution request packet.

4) A "quality level" field for storing a requested quality of stream data to be transmitted in response to the distribution request.

A format 202 of a packet storing stream data to be transmitted from the distribution server to a client has the following fields:

1) A "command" field for storing data indicating that the packet is a stream data packet.

2) A "distribution server IP address" field for storing an IP address of the distribution server which is the transmission source of stream data.

3) A "client IP address" field for storing an IP address of the client which is the transmission destination of stream data.

4) A "quality level" field for storing a quality of stream data stored in the packet.

5) A "time index" field for storing a time index value of stream data stored in the packet. The time index value is information indicating the time required to reproduce the stream data after the start of all the stream data was reproduced.

6) A "preceding stage server IP address" field for storing an IP address of the distribution server or relay server at the preceding stage which transmitted or relayed the stream data. When the packet is transmitted, the distribution server sets the IP address of its node to this field. When each relay server relays this packet, the relay server renews this field to the IP address of its node. Namely, each node received this packet can recognize from this field the IP address of the distribution server or relay server at the preceding stage.

7) A "data size" field for storing the size of the stream data stored in the packet.

8) A "data" field for storing the stream data of the packet.

A format 203 of a packet storing a quality change request has the following fields:

1) A "command" field for storing data indicating that the packet is a quality change request packet.

2) A "distribution server IP address" field for storing an IP address of the distribution server which is the transmission source of stream data whose quality was requested to be changed.

3) A "client IP address" field for storing an IP address of the client which is the transmission destination of stream data whose quality was requested to be changed.

4) A "quality level" field for storing a newly requested quality of stream data.

A format 204 of a packet storing a redistribution request has the following fields:

1) A "command" field for storing data indicating that the packet is a redistribution request packet.

2) A "distribution server IP address" field for storing an IP address of the distribution server which is the transmission source of stream data which was requested to be redistributed.

3) A "client IP address" for storing an IP address of the client which is the transmission destination of stream data which was requested to be redistributed.

4) A "time index" field for storing a time index value of stream data which was requested to be redistributed.

The structure of the distribution server will be described with reference to FIGS. 3 to 5.

FIG. 3 shows the overall structure of the distribution server 101. The distribution server 101 has a distribution request processing module 301, a transmission processing module 304, a quality request processing module 302, and a redistribution request processing module 303. The structure of each module will be described.

The distribution request processing module 301 receives a distribution request packet 201 from a client and enters data in a distribution management table 305 so that the transmission processing module 304 can start transmitting stream data satisfying the transmission request.

FIG. 4 shows the structure of the distribution management table 305. The distribution management table has the following fields:

1) A "client IP address" field 401 for storing the IP address of a client which issued the distribution request.

2) A "current quality level" field 402 for storing the quality level of stream data to be transmitted.

3) A "transmitted data time index" field 403 for storing the time index value of stream data to be transmitted next.

The distribution request processing module 301 performs initial settings of the "client ID address" and "current quality level" fields of the distribution management table 305 in accordance with the "client ID address" and "current quality level" fields of the received distribution request packet 201. The distribution request processing module 301 initializes the "transmitted data time index" field to 0.

The transmission processing module 304 is periodically driven by a timer. The transmission processing module 304 refers to the distribution management table 305 and reads stream data 105 from the auxiliary storage device 104, the stream data 105 having the quality level 402 and time index value 403 stored in the corresponding entry of the table. The read stream data is transmitted toward the client IP address 401 stored in the entry. After the transmission is completed, the value in the transmitted time index field 403 is incremented.

Figure 5:
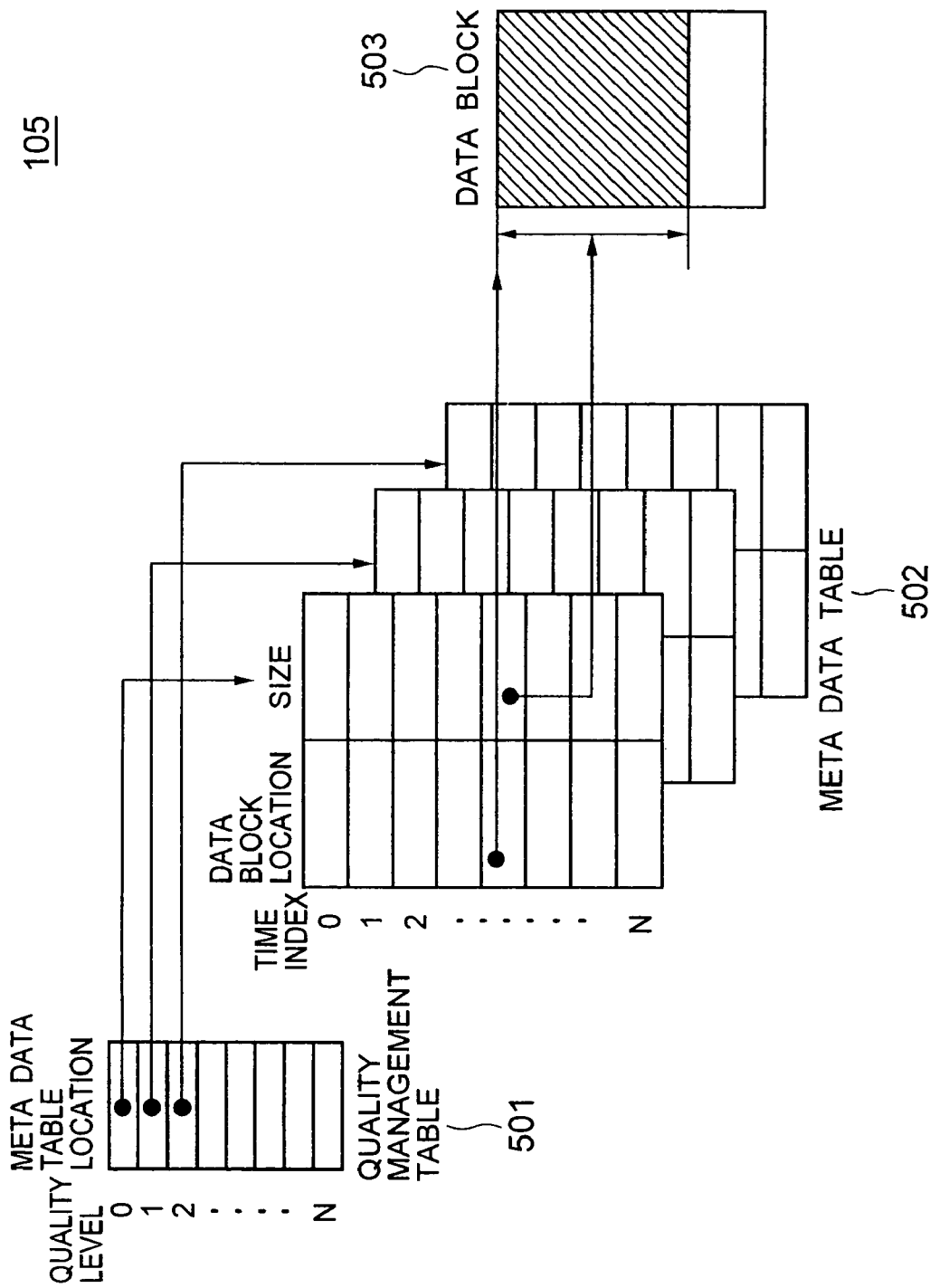
FIG. 5 shows the structure of stream data in an auxiliary storage device of the distribution server.

FIG. 5 shows the structure of stream data in an auxiliary-storage device of the distribution server.

As described above, it is necessary for the transmission processing module to read stream data having the designated quality level and time index value from the auxiliary storage device 104. To realize this data read, the stream data is stored in the auxiliary storage device 104 in the data format shown in FIG. 5.

The auxiliary storage device 104 has a quality management table 501 having entries for respective quality levels. Each entry of the quality management table 501 stores information representative of a location of a meta data table 502 for the stream data having the corresponding quality level.

The meta data table 502 stores meta data of stream data and has entries for respective time index values. Each entry of the meta data table stores the location information of a data block 503 of the stream data having the corresponding time index value and the effective data size information of the data block 503.

The transmission processing module 304 performs the following operations:

1) A meta data table corresponding to stream data having a designated quality level is searched from the quality management table 501.

2) A data block of the stream data having a designated time index is searched from the meta data table 502 and the stream data is read from the data block.

The transmission processing module 304 receives a redistribution request instruction from the redistribution request processing module 303. The operation thereof will be later described together with the description of the structure of the redistribution request processing module.

The redistribution request processing module 303 is driven in response to a reception of the redistribution request packet 204 from a relay server. The redistribution processing module 303 passes the information of the "client IP address" and "time index" stored in the packet to the transmission processing module 304. Upon reception of the information, the transmission processing module 304 immediately performs the following operations:

1) The transmission processing module 304 refers to the distribution management table 305 and acquires the current quality level 402 of stream data to be transmitted toward the passed "client IP address" 401.

2) The transmission processing module 304 reads the stream data having this "quality level" and passed "time index" from the auxiliary storage device, and transmits the stream data toward the passed "client IP address".

The quality request processing module 302 is driven in response to a reception of a quality change request packet 203 from a relay server. The quality request processing module 302 immediately renews the value in the "current quality level" field 402 of the distribution management table 305 to the value designated in the "quality level" field of the packet.

The structure of the relay server will be described with reference to FIGS. 6 to 8.

Figure 6:
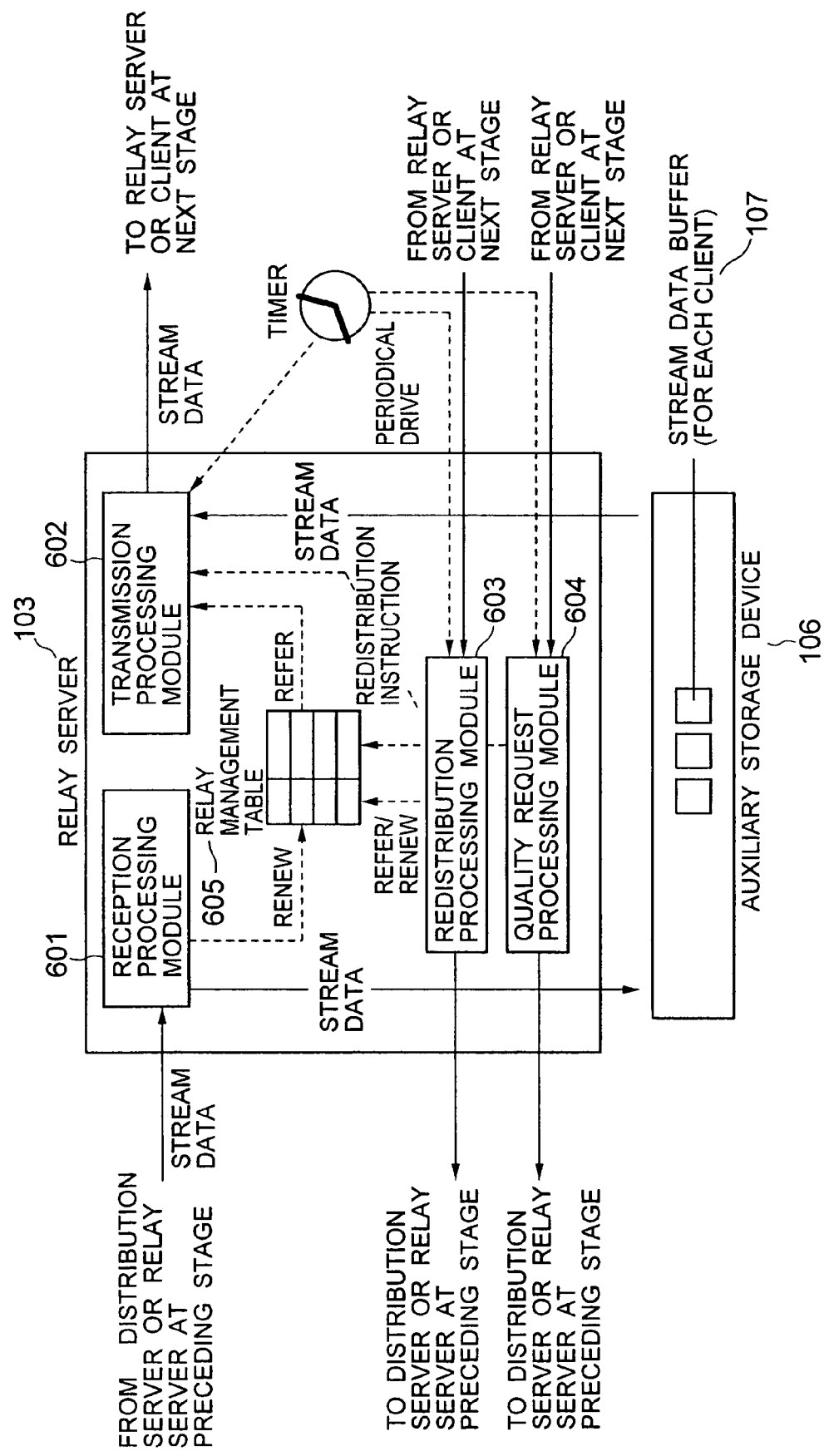
FIG. 6 shows the overall structure of a relay server.

FIG. 6 shows the overall structure of the relay server 103.

The relay server 103 has a reception processing module 601, a redistribution request processing module 603, a quality request processing module 604, and a transmission processing module 602. The structure of each module will be described.

The reception processing module 601 is driven in response to a reception of stream data from the distribution server or relay server at the preceding stage. At the same time when the reception processing module 601 stores the stream data in the auxiliary storage device 106, a relay server management table 605 is renewed.

Figure 7:
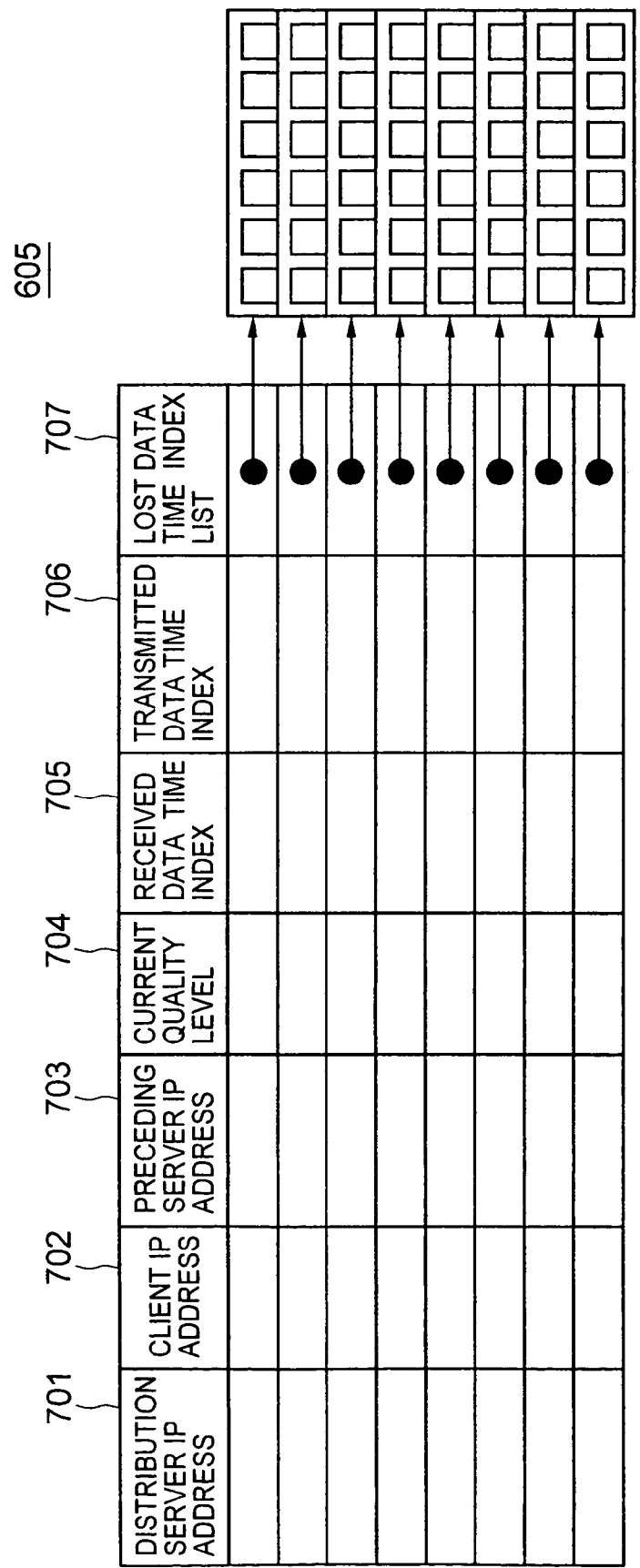
FIG. 7 shows the structure of a relay management table.

FIG. 7 shows the structure of the relay server management table 605.

The relay server management table has the following fields:

1) A "distribution server IP address" field 701 for storing an IP address of the distribution server which is the transmission source of stream data.

2) A "client IP address" filed 702 for storing an IP address of the client which is the transmission destination of the stream data.

3) A "preceding server IP address" field 703 for storing an IP address of the distribution server or relay server at the preceding stage.

4) A "current quality level" field 704 for storing a current quality level of the stream data.

5) A "received data time index" field 705 for storing a time index of the stream data expected to be received next.

6) A "transmitted data time index" field 706 for storing a time index of the stream data to be transmitted next.

7) A "lost data time index list" field 707 for storing a list of time index values of lost stream data.

Upon reception of the stream data, the reception processing module 601 renews the relay server management table 605 in the following operation sequence:

1) An entry of the relay server management table 605 is searched which has the same values as those in the "distribution server IP address" and "client IP address fields of the received packet 202 storing the stream data.

2) If the entry does not exist at 1), a new entry is formed. The "distribution server IP address" field 701, "client IP address" field 702, "preceding server IP address" field 703, "current quality level" field 704 and "received data time index" field 705 of the new entry are initialized to the values in the "distribution server IP address" field, "client IP address" field, "preceding server IP address" field, "quality level" field, and "time index" field of the packet. The "transmitted data time index" field 706 of the entry is initialized to the same value as that in the "received data time index field 705.

3) If the entry exists at 1), the value in the "current quality level" field 704 of the entry is renewed to the value in the "quality level" field of the packet. The value in the "received data time index" field 705 of the entry is compared with the value in the "time index" field of the packet. In accordance with the comparison result, the following operations are performed:

A) If the latter (a value in the "time index" field) is larger by 1 than the former (a value in the "received data time index" field), it is judged that the stream data was received without any lost data, and the value in the "received data time index" field 705 of the entry is renewed to the value in the "time index" field of the packet.

B) If the latter is larger by 2 or more than the former, it is judged that there is lost data. The value in the "received data time index" field 705 of the entry is renewed to the vale in the "time index field" of the packet, and thereafter, the time index value of the lost data is added to the "lost time index list" field 707.

C) If the latter is smaller than the former, it is judged that the packet stores redistributed stream data, and the value in the "time index" field of the packet is removed from the "lost time index list" field 707 of the entry.

The redistribution request processing module 603 is periodically driven by a timer. The redistribution processing module 603 issues a redistribution request for the stream data having the time index value stored in the "lost data time index list" field 707 of each entry of the relay management table 605. More specifically, a redistribution request packet 204 is formed and transmitted toward the "preceding server IP address" 703 of the entry. The values in the "distribution server IP address" and "client IP address" fields of the packet are copied from the corresponding fields of the entry. The value in the "time index" field of the packet is copied from the "lost data time index list" field 707 of the entry.

The redistribution request processing module 603 is also driven in response to a reception of a redistribution request packet 204 from the relay server or client at the next stage of the subject relay server. In this case, the information stored in the "distribution server IP address", "client IP address" and "time index" fields of the packet is passed to the transmission processing module 602, and a redistribution instruction is issued to the transmission processing module 602. The operation to be performed by the transmission processing module 602 in this case will be later described together with the description of the structure of the transmission processing module 602.

The quality request processing module 604 is periodically driven by the timer to perform the following operations:

1) It is checked for each entry of the relay server management table 605 whether the data amount in the stream data buffer 107 is a predetermined amount or less and whether an occurrence probability of loss of stream data is a predetermined value or higher. The former is checked depending upon whether a difference between values in the "received data time index" and "transmitted data time index" fields is a predetermined value or smaller. The latter is checked depending upon whether the time index value stored in the "lost data time index" field is a predetermined value or higher.

2) If it is judged at 1) that the data amount is the predetermined amount of less or the occurrence probability is the predetermined value or higher, the quality change request packet 203 is transmitted to the distribution server or relay server at the preceding stage of its node. The values in the "distribution server IP address" and "client IP address" fields of the packet are copied from the corresponding fields of the entry. The value in the "quality level" field of the packet is set to a value in the "current quality level" field 704 of the entry subtracted by 1.

The quality-request processing module 604 is also driven in response to a reception of a quality change request packet 203 from the relay server or client at the next stage of the subject relay server. In this case, the packet is simply transferred to the distribution server or relay server at the preceding stage.

The transmission processing module 602 is periodically driven by the timer. For each entry of the relay server management server 605, the transmission processing module 602 performs the following operations:

1) It is judged from a difference between values in the "received data time index" and "transmitted data time index" fields of the entry whether the data amount in the stream data buffer 107 is the predetermined amount or more.

2) Only when the data amount is the predetermined amount or more, it is judged that the stream data is transferred between the nodes designated by the values in the "distribution server IP address" field 701 and "client server IP address" field 702 of the entry. The stream data having the time index value designated in the "transmitted data time index" field 706 is read from the auxiliary storage device 106 and transmitted toward the "client IP address" 706.

Figure 8:
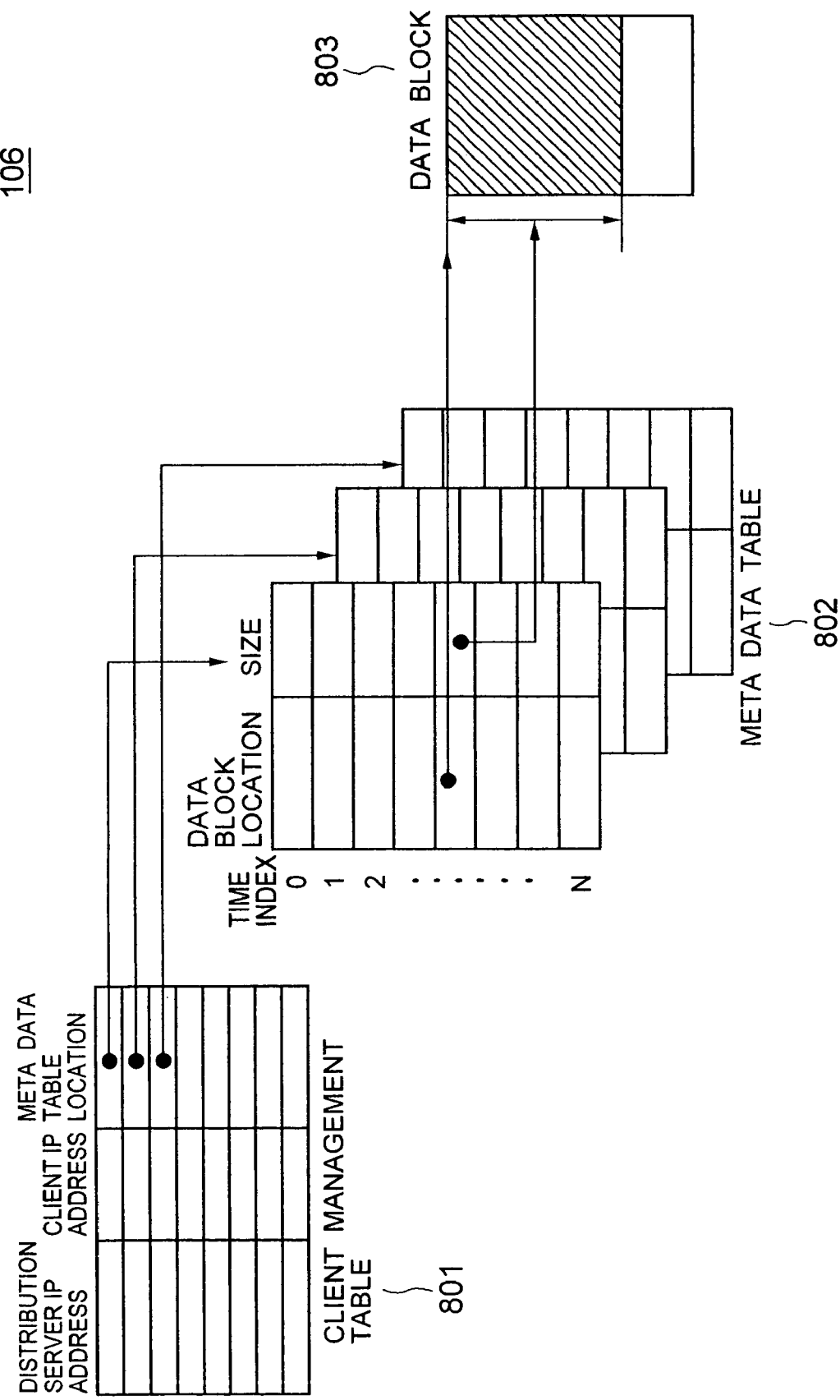
FIG. 8 shows the structure of stream data in an auxiliary storage device of the relay server.

FIG. 8 shows the structure of stream data in an auxiliary storage device of the relay server.

As described above, it is necessary for the transmission processing module 602 to read stream data having the designated distribution IP address, client IP address and time index value from the auxiliary storage device 106. To realize this data read, the stream data is stored in the auxiliary storage device 106 in the data format shown in FIG. 8.

The auxiliary storage device 106 has a client management table 801 having entries for respective pairs of the distribution server IP address and client IP address. Each entry of the client management table 801 stores information representative of a location of a meta data table 802 for the stream data transferred between the distribution server and client. The structures of the meta data table 802 and data block 803 are similar to those shown in FIG. 5, and the description thereof is omitted. Stream data read by the transmission processing module 602 is similar to stream data read by the transmission processing module 304 of the distribution server 101, and the detailed description thereof is omitted.

The transmission processing module 602 is also driven in response to a reception of a redistribution instruction from the redistribution request processing module 603. In this case, as described above, information of the "distribution server IP address", "client IP address" and "time index" is received from the redistribution request processing module 603. The transmission processing module 602 reads the corresponding stream data from the auxiliary storage device and transmits it toward the received "client IP address".

Figure 9:
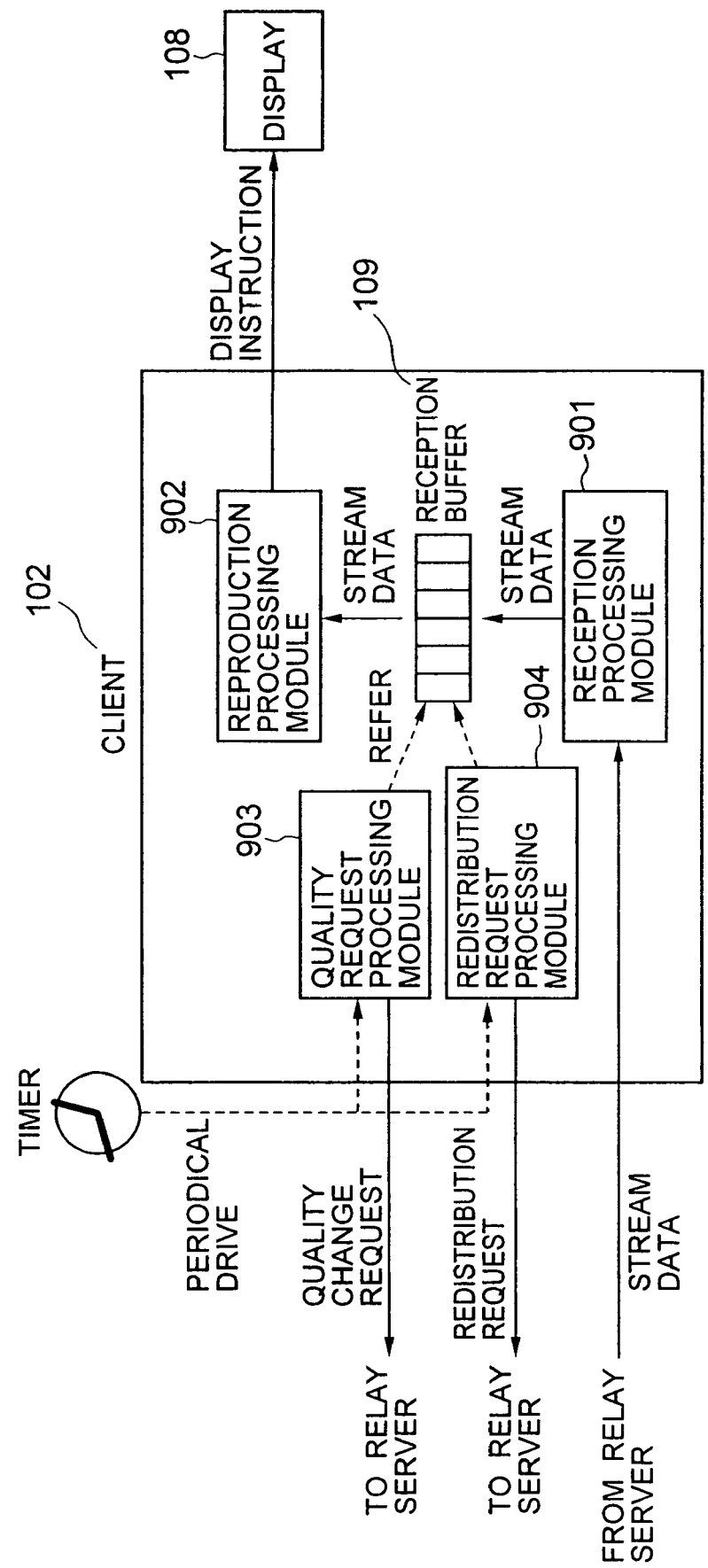
FIG. 9 shows the overall structure of a client.

FIG. 9 shows the structure of the client.

The client 102 has a reception processing module 901, a reproduction processing module 902, a quality request processing module 903 and a redistribution request processing module 904. The structure of each module will be described.

The reception processing module 901 receives an arrival stream data packet 202 at the reception buffer 109. In the reception buffer 109, stream data packets 202 are sorted by the value in the "time index" field. The reproduction processing module 902 reads the stream data from the reception buffer and issues a display instruction to the display 108.

The quality request processing module 903 is periodically driven by a timer. It is checked by referring to the state of the reception buffer whether the data amount in the reception buffer is a predetermined amount of more and whether the occurrent probability of loss of packets is a predetermined value or higher. If one of the conditions is satisfied, a quality change request packet 203 is transmitted to the relay server at the preceding stage. The values in the "distribution server IP address" and "client IP address" fields of the stream data packet 202 stored in the reception buffer are set to the "distribution server IP address" and "client IP address" fields of the packet. The value in the "quality level" field of the packet is set to a value in the "quality level" field of the stream data packet 202 at the end of the reception buffer subtracted by 1.

The redistribution request processing module 904 is also periodically driven by the timer. The values in the "time index" fields of the stream data packets 202 stored in the reception buffer are checked to judge whether there is a packet loss. If there is a packet loss, the time index value of the stream data requested to be redistributed is acquired. A redistribution request packet 204 is transmitted to the relay server at the preceding stage. The values in the "distribution server IP address" and "client IP address" fields of the stream data packet 202 stored in the reception buffer are set to the "distribution server IP address" and "client IP address" fields of the packet. The acquired time index value is stored in the "time index" field of the packet.

Figure 10:
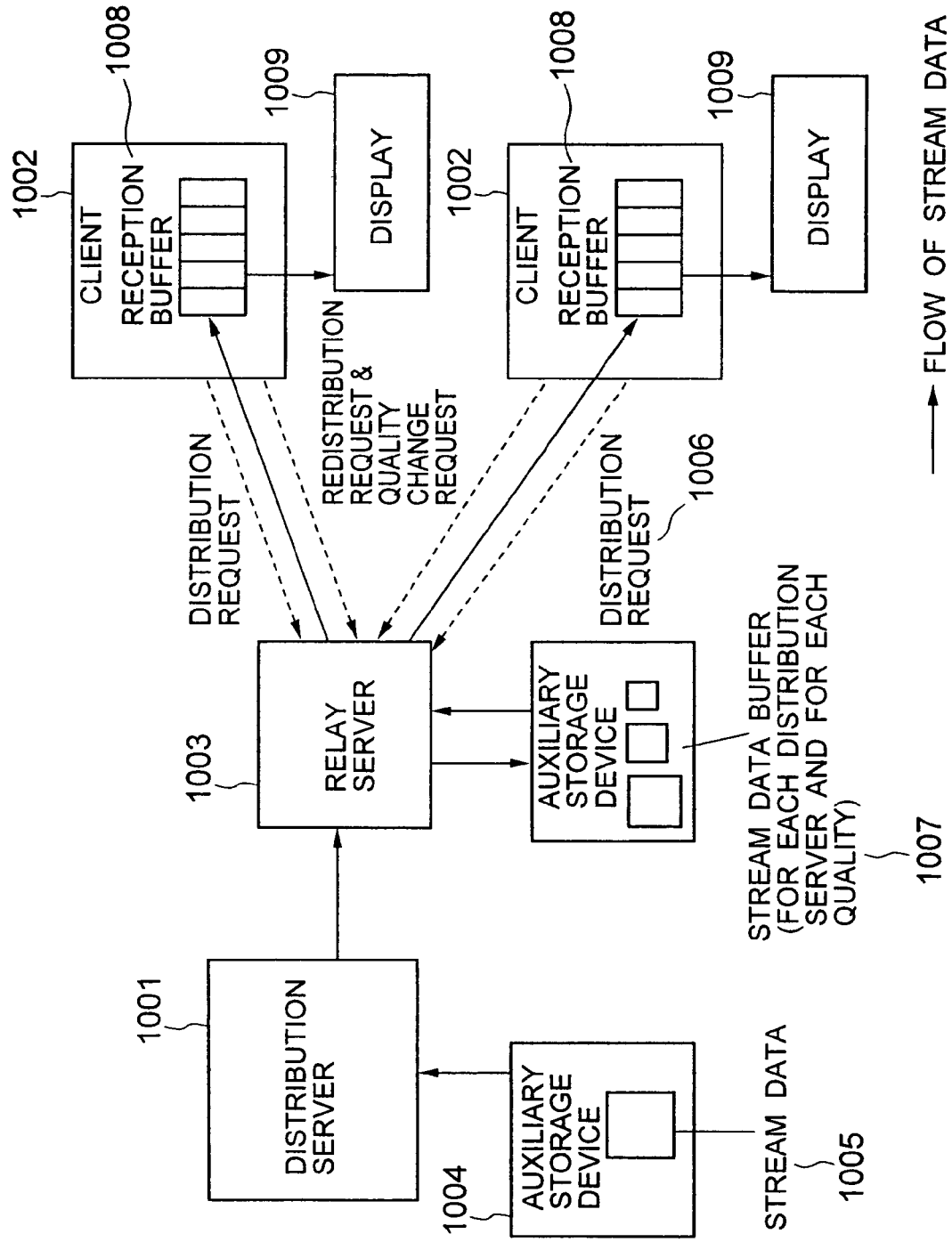
FIG. 10 shows the structure of a system according to a second embodiment of the invention.
Figure 11:
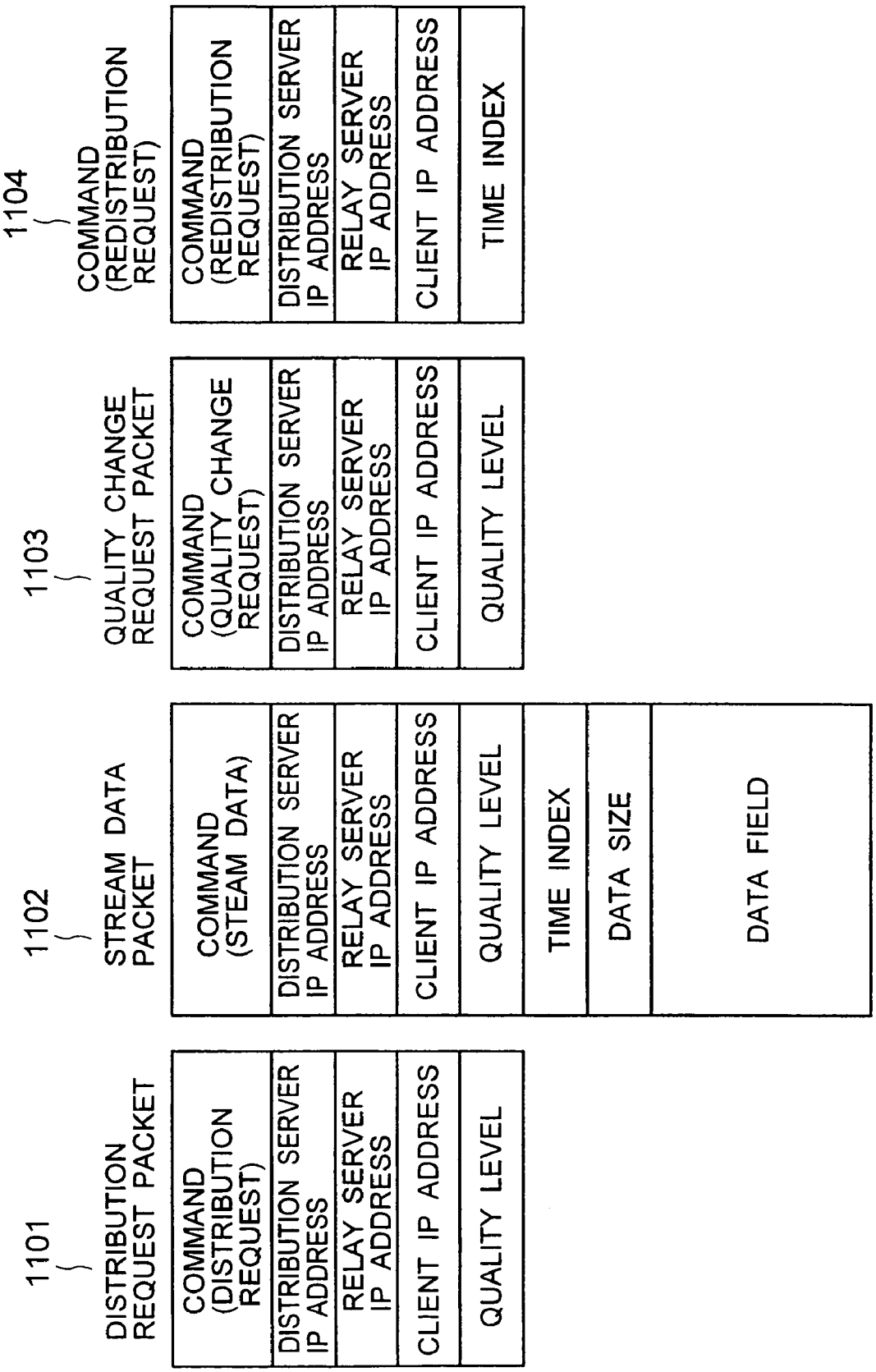
FIGS. 11A to 11D show the formats of packets to be transferred between nodes.

FIG. 10 shows the structure of a system according to a second embodiment of the invention.

In this system, a distribution server 1001 reads stream data 1005 from an auxiliary storage device 1004 and transmits it to a relay server 1003. The relay server 1003 buffers the received stream data in a stream data buffer 1007 in an auxiliary storage device 1006.

When each client 1002 requests for a reception of stream data, a distribution request is transmitted to the relay server 1003. Upon reception of the distribution request, the relay server 1003 reads the stream data from the stream data buffer 1007 in the auxiliary storage device 1006, and distributes it to the client 1002. The distribution request contains information of a requested quality of the stream data. The relay server 1003 changes the quality of the stream data in the stream data buffer 1007 to the requested quality, and transmits it to the client 1002. This quality change is realized by thinning the stream data received from the distribution server 1001 (by lowering a frame rate, i.e., time resolution).

The client 1002 refers to the reception buffer 1008 and inspects whether there is a loss of stream data. If there is a loss of data, a data redistribution request is issued to the relay server 1003. Upon reception of this redistribution request, the relay server 1003 reads the data from the stream data buffer 1007 and redistributes it.

The client 1002 also refers to the reception buffer 1008 and inspects whether the amount of buffered data becomes a predetermined amount or less and whether an occurrence probability of loss of stream data becomes a predetermined value or higher. If one of the two conditions is satisfied, it is judged that the network is in an overload state, and a quality change request for lowering the quality is transmitted to the relay server 1003. Upon reception of this request, the relay server 1003 lowers the stream data to be transmitted thereafter to the requested quality, i.e. increases a thinning rate of the stream data.

The system having the structure shown in FIG. 10 has the following advantages:

1) The redistribution request process and quality change process are executed between the relay server and client. It is therefore possible to shorten the time from issuance of the redistribution request to arrival of redistributed stream data. The time from issuance of the quality change request to realizing the quality change can also be shortened. It is therefore possible to reduce the capacity of the reception buffer to be prepared at the client.

2) Similarly, since the redistribution request process is executed between the relay server and client, it is possible to narrow the network bandwidth to be consumed by redistribution.

The format of data to be transferred between nodes shown in FIG. 10 will be described first, and then the structures of the relay server will be described in detail. The structures of the distribution server and client are the same as those described earlier, and the description thereof is omitted.

FIGS. 11A to 11D show the formats of data to be transferred between nodes shown in FIG. 10. These data formats are the same as those shown in FIG. 2, excepting the following points:

1) Each packet has a "relay server IP address" field for storing an IP address of the relay server.

2) A stream data packet has no "preceding stage server IP address field".

The structure of the relay server will be described with reference to FIGS. 12 and 13.

Figure 12:
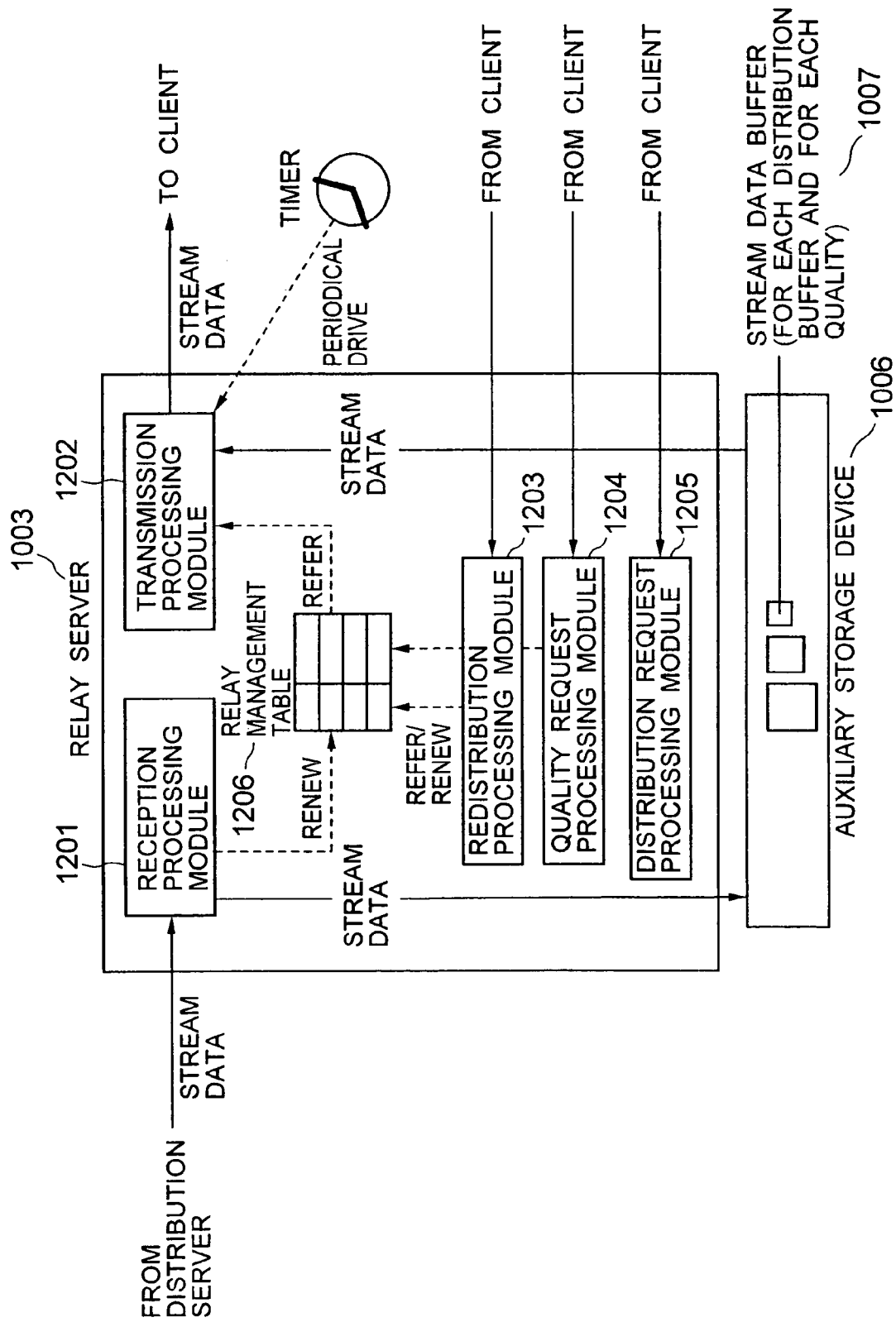
FIG. 12 shows the overall structure of a relay server of the second embodiment.

FIG. 12 shows the overall structure of the relay server 1003.

The relay server 1003 has a reception processing module 1201, a distribution request processing module 1205, a redistribution request processing module 1203, a quality request processing module 1204, and a transmission processing module 1202. The structure of each module will be described.

The reception processing module 1201 is driven in response to a reception of stream data from the distribution server. At the same time when the reception processing module 1201 stores the stream data in the auxiliary storage device 1006, a relay server management table 1206 is renewed.

FIGS. 13A and 13B show the structure of the relay server management table 1206. The relay server management table has a distribution server management table part and a client management table part. The distribution server management table part is used for managing a distribution server which transmits stream data to the relay server, and has entries for respective distribution servers. The client management table part is used for managing a client which receives stream data from the relay server, and has entries for respective clients.

The distribution server management table part has the following fields:

1) A "distribution server IP address" field 1301 for storing an IP address of the distribution server which is the transmission source of stream data.

2) A "received data time index" field 1302 for storing a time index value of stream data to be received next.

3) A "transmitted data time index" field 1303 for storing a time index of stream data to be transmitted next.

The client management table part has the following fields:

1) A "distribution server IP address" field 1304 for storing an IP address of the distribution server which is the transmission source of stream data.

2) A "client IP address" field 1305 for storing an IP address of a client which is the transmission destination of the stream data.

3) A "requested quality" field 1306 for storing the quality level of stream data to be transmitted.

4) A "lost data time index list" field 1307 for storing a list of time index values of lost stream data.

Upon reception of the stream data, the reception processing module 1201 renews the distribution server management table part of the relay server management table 1206 and stores stream data in the auxiliary storage device 1006 in the following operation sequence:

1) An entry of the relay server management table part of the relay server management table 1206 is searched which has the same value as that in the "distribution server IP address" field of the received packet 1102 storing the stream data.

2) If the entry does not exist at 1), a new entry is formed. The "distribution server IP address" field 1301 of the new entry is initialized to the value in the "distribution server IP address" field of the packet. The values in the "received data time index" field 1302 and "transmitted data time index" field 1303 are initialized to the value in the "time index" field of the received data added with 1.

3) If the entry exists at 1), the value in the "received time index" field 1302 of the entry is renewed to the value in the "time index" field of the received stream data added with 1.

4) In addition, if the entry exists at 1, the client management table part of the relay server management table 1206 is searched to acquire a list of the "requested quality" fields 1306 corresponding to the "distribution server IP address" field 1301. The quality of the received stream data is changed to the acquired quality levels, and the stream data is stored in the auxiliary storage device.

The distribution request processing module 1205 is driven in response to a reception of a distribution request from a client. In order to perform the transmission satisfying this distribution request, an entry of the client management table part of the relay server table 1206 is newly formed in the following manner:

1) The values in the "distribution server IP address", "client IP address" and "distribution server IP address fields of the distribution request packet 1101 are copied to the "distribution IP address" field 1304, "client IP address" field 1305 and "requested quality" field 1306 of the newly formed entry.

2) The "lost data time index list" field 1307 is initialized to be empty.

The redistribution request processing module 1203 is driven in response to a reception of the redistribution request packet 1104 from a client. In this case, an entry of the client management table part of the relay server management table 1206 is searched which corresponds to the "distribution server IP address" and "client IP address" of the redistribution request packet. The value in the "time index" field of the packet is added to the "lost data time index list" field 1307 of the searched entry.

The quality request processing module 1204 is driven in response to a reception of the quality change request packet 1103 from a client. In this case, an entry of the client management table part of the relay server management table 1206 is searched which corresponds to the "distribution server IP address" and "client IP address" of the quality change request packet. The value in the "requested quality" field 1306 of the entry is renewed to the value in the "quality level" field of the packet.

The transmission processing module 1202 is periodically driven by a timer. For each entry of the distribution server management table part of the relay server management table 1206, the transmission processing module 1202 performs the following operations:

1) It is judged from a difference between values in the "received data time index" and "transmitted data time index" fields of the entry whether the data amount in the stream data buffer 1007 is a predetermined amount or more.

2) Only when the data amount is the predetermined amount or more, entries of the client management table part are acquired which correspond to the "distribution server IP address" 1301 of the subject entry. For each entry of the client management table part, the transmission processing module 1202 performs the following operations:

A) Stream data designated by the "distribution server IP address" field 1301, "transmitted data time index" field 1302 and "requested quality" field 1306 is read from the stream data buffer 1007 in the auxiliary storage device 1006. The value in the "transmitted data time index" field 1302 is incremented.

B) The read stream data is transmitted to the client designated by the "client IP address" field 1305.

C) Stream data designated by the "distribution server IP address" field 1301, each index value in the "lost data time index list" fields 1307, and "requested quality" field 1306 is read from the stream data buffer 1007 in the auxiliary storage device 1006. The values in the "lost-data time index" fields 1307 are renewed to be empty.

D) The read stream data is transmitted to the client designated by the "client IP address" field 1305.

As described above, it is necessary for the transmission processing module 1202 to read stream data having the designated distribution IP address, quality and time index value from the auxiliary storage device 1006. This data read can be realized by the method described with the first embodiment, and the details thereof are omitted.

The invention provides the following advantages:

1) The capacity of a reception buffer to be prepared at a client can be made small.

2) The network bandwidth necessary for redistribution can be narrowed.

3) Quality change can be made not only by lowering the time resolution but also by lowering the space resolution.

It should be further understood by those skilled in the art that the foregoing description has been made on embodiments of the invention and that various changes and modifications may be made in the invention without departing from the spirit of the invention and the scope of the appended claims.

What is claimed is:

1. A data distribution method of distributing data including reproduction time information read from a first information storage device to an information reception apparatus by an information transmission apparatus via a network, the method comprising the steps of:

receiving the data at an information relay apparatus interposed between the information transmission apparatus and the information reception apparatus, and writing the received data in a second information storage device;

when a difference of the reproducing time information included in preceding data and trailing data already stored in the second information storage device is calculated by the information relay apparatus and it can be confirmed that the difference amount is equal to more than a specified amount, reading the data from the second information storage device and transmitting the data to the information reception apparatus;

if the information relay apparatus detects data not stored in the second information storage device, transmitting a redistribution request for the data to either the information transmission apparatus or another information relay apparatus; and reading the data from the first or second information storage device at the information transmission apparatus or the other information relay apparatus that received the redistribution request and transmitting the read data.

2. The data distribution method according to claim 1, wherein, the information transmission apparatus and information relay apparatus store IP addresses of their own apparatuses to data to be transmitted or relayed;

if the information relay apparatus detects a loss of data stored in the second information storage device, it reads out an IP address of the distribution server or another relay server placed at a preceding stage stored in the data and transmits a redistribution request of data to either the information transmission apparatus or another information relay apparatus at a preceding stage.

3. The data distribution method according to claim 1, wherein, the data transmitted from the information transmission apparatus to the information reception apparatus is constituted by a packet storing a stream data; and the packet is constituted by having the following fields of:

a "command" field for storing data indicating that the packet is a stream data packet;

a "transmission source IP address" field for storing an IP address of the information transmission apparatus which is the transmission source of stream data;

a "client IP address" field for storing an IP address of the client acting as the information reception apparatus which is the transmission destination of stream data;

a "quality level" field for indicating a quality of stream data stored in the packet;

a "time index" field for storing a time index value of stream data indicating the time required to reproduce the stream data stored in the packet after the start of all the stream data was reproduced;

a "preceding stage server IP address" field for storing an IP address of the information relay apparatus that relayed the stream data;

a "data size" field for storing the size of the stream data stored in the packet; and a "data" field for storing the stream data of the packet.

4. The data distribution method according to claim 1, wherein, a packet storing the redistribution request has the following fields:

a "command" field for storing data indicating that the packet is a redistribution request packet;

a "distribution server IP address" field for storing an IP address of the information transmission apparatus which is the transmission source of stream data which was requested to be redistributed;

a "client IP address" for storing an IP address of the client acting as the information reception apparatus which is the transmission destination of stream data which was requested to be redistributed; and a "time index" field for storing a time index value of stream data which was requested to be redistributed.

5. The data distribution method according to claim 1, wherein, the first information storage device stores the distribution management table having the following fields:

a "client IP address" field for storing the IP address of the information reception apparatus which issues the distribution request.

a "current quality level" field for storing the quality level of stream data to be transmitted; and a "transmitted data time index" field for storing the time index value of stream data to be transmitted next.

6. The data distribution method according to claim 1, wherein, the second information storage device stores a relay server management table having the following fields:

a "distribution server IP address" field for storing an IP address of the information reception apparatus acting as the distribution server which is the transmission source of stream data to be transmitted;

a "client IP address" field for storing an IP address of the information reception apparatus acting as the transmission destination of the stream data;

a "preceding server IP address" field for storing an IP address of the information relay apparatus at the preceding stage;

a "current quality level" field for storing a current quality level of the stream data;

a "received data time index" field for storing a time index of the stream data expected to be received next;

a "transmitted data time index" field for storing a time index of the stream data to be transmitted next; and a "lost data time index list" field for storing a list of time index values of lost stream data.

7. The data distribution method according to claim 6, wherein, if a value in a "time index" field of a packet storing a stream data is larger by 1 than a value in the "received data time index" field, it is judged that the stream data was received without any lost data, and the value in the "received data time index" field of the entry is renewed to the value in the "time index" field of the packet.

8. The data distribution method according to claim 6, wherein, if a value in a "time index" field of a packet storing a stream data is larger by 2 or more than a value in the "received data time index" field, it is judged that there is lost data, and after the value in the "received data time index" field of the entry is renewed to the value in the "time index field" of the packet, a list of the time index value of the lost data is added to the "lost time index list" field.

9. The data distribution method according to claim 6, wherein, if a value in a "time index" field of a packet storing a stream data is smaller than a value in the "received data time index" field, the packet is smaller than the former, it is judged that the packet stores redistributed stream data, and the value stored in the "time index" field of the packet is removed from the "lost time index list" field of the entry.

10. A data distribution method for distributing data read out of a first information storage device to an information reception apparatus by an information transmission apparatus via a network comprising the steps of:
    making a table in advance for indicating in what block of the information storage device is stored each of a plurality of data of different quality stored in the first information storage device for every reproduction time and reading out one of the data with the information transmission apparatus;
    receiving the data and storing it in a second information storage device by an information relay apparatus interposed between the information transmission apparatus and the information reception apparatus;
    transmitting the data read out of the second information storage device to the information reception apparatus by the information relay apparatus;
    if the amount of data stored in the second information storage device becomes less than a specified amount, transmitting a request for modifying quality of data to the information transmission apparatus by the information relay apparatus; and
    determining a block in the information storage device to be read out in accordance with the table in reference to the present requested quality and the present distributing time by the information transmission apparatus receiving the request for modifying quality and changing the data read out of the first information storage device.

11. The data distribution method according to claim 10, wherein, the information transmission apparatus and information relay apparatus store IP addresses of their own apparatuses to data to be transmitted or relayed;
    if the information relay apparatus detects a loss of data stored in the second information storage device, it reads out an IP address of the distribution server or another relay server placed at a preceding stage stored in the data and transmits a redistribution request of data to either the information transmission apparatus or another information relay apparatus at a preceding stage.

12. The data distribution method according to claim 10, wherein, the data transmitted from the information transmission apparatus to the information reception apparatus is constituted by a packet storing a stream data; and the packet is constituted by having the following fields of:
    a "command" field for storing data indicating that the packet is a stream data packet;
    a "transmission source IP address" field for storing an IP address of the information transmission apparatus which is the transmission source of stream data;
    a "client IP address" field for storing an IP address of the client acting as the information reception apparatus which is the transmission destination of stream data;
    a "quality level" field for indicating a quality of stream data stored in the packet;
    a "time index" field for storing a time index value of stream data indicating the time required to reproduce the stream data stored in the packet after the start of all the stream data was reproduced;
    a "preceding stage server IP address" field for storing an IP address of the information relay apparatus that relayed the stream data;
    a "data size" field for storing the size of the stream data stored in the packet; and
    a "data" field for storing the stream data of the packet.

13. The data distribution method according to claim 10, wherein, a packet storing the request for modifying quality of data has the following fields:
    a "command" field for storing data indicating that the packet is a quality change request packet;
    a "distribution server IP address" field for storing an IP address of the distribution server which is the transmission source of stream data whose quality was requested to be changed;
    a "client IP address" field for storing an IP address of the client acting as the information reception apparatus which is the transmission destination of stream data whose quality was requested to be changed; and
    a "quality level" field for storing a newly requested quality of stream data.

14. The data distribution method according to claim 10, wherein, a packet storing the redistribution request has the following fields:
    a "command" field for storing data indicating that the packet is a redistribution request packet;
    a "distribution server IP address" field for storing an IP address of the information transmission apparatus which is the transmission source of stream data which was requested to be redistributed;
    a "client IP address" for storing an IP address of the client acting as the information reception apparatus which is the transmission destination of stream data which was requested to be redistributed; and
    a "time index" field for storing a time index value of stream data which was requested to be redistributed.

15. The data distribution method according to claim 10, wherein, the second information storage device stores a relay server management table having the following fields:
    a "distribution server IP address" field for storing an IP address of the information transmission apparatus acting as the distribution server which is the transmission source of stream data to be transmitted;
    a "client IP address" field for storing an IP address of the information reception apparatus acting as the transmission destination of the stream data;
    a "preceding server IP address" field for storing an IP address of the information relay apparatus at the preceding stage;
    a "current quality level" field for storing a current quality level of the stream data;
    a "received data time index" field for storing a time index of the stream data expected to be received next;
    a "transmitted data time index" field for storing a time index of the stream data to be transmitted next; and
    a "lost data time index list" field for storing a list of time index values of lost stream data.

* * * * *